US012763635B2

(12) United States Patent
Ahec et al.

(10) Patent No.: US 12,763,635 B2
(45) Date of Patent: Oct. 13, 2026

(54) INVERTER AND A MOTOR COMPRISING THE INVERTER

(71) Applicant: Mahle International GmbH, Stuttgart (DE)

(72) Inventors: Ziga Ahec, Grosuplje (SI); Gregor Babic, Videm-Dobrepolje (SI); Luka Verdev, Velenje (SI)

(73) Assignee: Mahle International GmbH (DE)

(*) Notice: Subject to any disclaimer, the term of this patent is extended or adjusted under 35 U.S.C. 154(b) by 1137 days.

(21) Appl. No.: 17/835,940

(22) Filed: Jun. 8, 2022

(65) Prior Publication Data

US 2022/0399777 A1 Dec. 15, 2022

(30) Foreign Application Priority Data

Jun. 9, 2021 (EP) .................................... 21178430

(51) Int. Cl.

| | |
|---|---|
| ***H02K 5/22*** | (2006.01) |
| ***H02K 9/28*** | (2006.01) |
| ***H02M 7/00*** | (2006.01) |
| ***H02P 27/06*** | (2006.01) |

(52) U.S. Cl.

CPC ............... *H02K 5/225* (2013.01); *H02K 9/28* (2013.01); *H02M 7/003* (2013.01); *H02P 27/06* (2013.01)

(58) Field of Classification Search

CPC ...... B65D 5/3621; B65D 5/504; B65D 71/72; H02K 11/33; H02K 2203/03; H02K 5/225; H02K 9/28; H02M 7/003; H02P 27/06

See application file for complete search history.

(56) References Cited

U.S. PATENT DOCUMENTS

| | | | | |
|---|---|---|---|---|
| 10,850,623 B2 | 12/2020 | Chung | | |
| 11,398,762 B2 | 7/2022 | Kobayashi | | |
| 2020/0352041 A1* | 11/2020 | Bulovic | ................ | H01L 23/045 |

FOREIGN PATENT DOCUMENTS

| | | | | |
|---|---|---|---|---|
| CN | 210297472 U | 4/2020 | | |
| CN | 111316544 A | 6/2020 | | |
| DE | 19756186 C1 * | 6/1999 | ............. | H02K 9/223 |
| DE | 102019126531 A1 * | 4/2021 | ............ | F04C 23/008 |

(Continued)

OTHER PUBLICATIONS

JP-2019057968-A, all pages (Year: 2019).*

(Continued)

*Primary Examiner* — Naishadh N Desai
(74) *Attorney, Agent, or Firm* — Fishman Stewart PLLC

(57) ABSTRACT

An inverter for an electric motor may include a capacitor board and at least one electrically conductive contacting unit. The capacitor board may include at least one capacitor and at least one transistor board. The capacitor board and the at least one transistor board may be aligned transversely to a longitudinal direction. The capacitor board and the at least one transistor board may be electrically interconnected. The at least one electrically conductive contacting unit may be configured to contact at least one electrically conductive phase terminal of the motor. The at least one contacting unit may be connected to the at least one transistor board in an electrically conductive manner. The at least one contacting unit may be resilient in the longitudinal direction.

19 Claims, 6 Drawing Sheets

(56) References Cited

FOREIGN PATENT DOCUMENTS

JP 2019057968 A * 4/2019

OTHER PUBLICATIONS

DE-19756186-C1, all pages (Year: 1999).*
DE-102019126531-A1, all pages (Year: 2021).*
English abstract for JP-2019057968.
English abstract for DE-19756186.
EP Search Report for EP-21178430.1, dated Nov. 25, 2021.
Chinese Office Action and Search Report, CN202210601102.3, dated Mar. 25, 2026 (w_translation).

* cited by examiner

INVERTER AND A MOTOR COMPRISING THE INVERTER

CROSS-REFERENCE TO RELATED APPLICATIONS

This application claims priority to European Application No. EP 21178432.7 filed on Jun. 9, 2021, the contents of which is hereby incorporated by reference in its entirety.

TECHNICAL FIELD

The invention relates to an EMI filter comprising a choke. The invention also relates to an inverter for an electric motor comprising the EMI filter.

BACKGROUND

An electrical device is to generally not interact electromagnetically with other devices in its vicinity. In reality, however, an inverter causes high electromagnetic interferences (EMI), which are generated by a quick change of voltages on the parasitic capacitances and currents on the parasitic inductances when switching over semiconductors in the inverter. To reduce the electromagnetic interferences and to increase the compatibility of the inverter with other electrical devices, an EMI filter can be switched in the inverter.

The electromagnetic interferences are thereby divided into a common mode (CM) and a differential mode (DM). The EMI filter is to thereby be able to filter the electromagnetic interferences in the common mode (CM) as well as in the differential mode (DM). For this purpose, conventional EMI filters have a common mode choke and a differential mode choke in combination with capacitors.

The chokes are realized from time to time by magnetic cores, which are arranged at conductors of the inverter. The magnetic cores can thereby be realized in E-shape, C-shape, U-shape, and I-shape. Chokes comprising magnetic cores of this type are known, for example, from US 2009051478 A1 and EP 2357727 A1. In addition, it is known from CN 111415810 A to arrange two ring-shaped magnetic cores inside one another. Disadvantageously, EMI filters of this type or chokes of this type, respectively, have a high space requirement, which is not available from time to time. In addition, chokes of this type cannot be used in the case of high direct currents.

SUMMARY

It is thus the object of the invention to specify an improved or at least alternative embodiment for an EMI filter and an inverter of the generic type, in the case of which the described disadvantages are overcome. The EMI is to in particular be formed in a space-saving manner. The EMI filter is to in particular be suitable for high direct currents.

According to the invention, this object is solved by means of the subject matter of the independent claim(s). Advantageous embodiments are subject matter of the dependent claim(s).

An EMI filter (EMI: electromagnetic interference) is provided for an inverter. The inverter can be provided for an electric motor. The EMI filter thereby has a choke comprising a magnetic inner core, comprising a magnetic outer core, and comprising at least one conductor pair. The at least one conductor pair thereby has an electrically conductive positive conductor and an electrically conductive negative conductor. In the choke, the inner core, the outer core, and the respective conductors of the at least one conductor pair extend along a longitudinal central axis of the choke. The inner core is thereby arranged in the outer core, and the respective conductors of the at last one conductor pair are arranged between the inner core and the outer core. The respective adjacent conductors are thereby arranged spaced apart from one another in a circumferential direction, which revolves around the longitudinal central axis. In addition, the inner core and the outer core are arranged spaced apart from one another in a radial direction, which is aligned radially to the longitudinal central axis. A gap is thus in each case formed between the inner ring, the outer ring, and the respective conductors, which are adjacent in the circumferential direction.

In the EMI filter according to the invention, the respective conductors of the at least one conductor pair are encased by the outer core in the circumferential direction. The choke is thus suitable to filter the electromagnetic interferences in the common mode. The magnetic flux in the common mode is thereby directed around the choke according to the right-hand rule with respect to the current direction of common-mode current in the conductors. In addition, the inner core in the EMI filter according to the invention is arranged between the conductors of the at least one conductor pair or is surrounded by the conductors of the at least one conductor pair in the circumferential direction, respectively. The magnetic path from the outer core to the inner core is thus completed in each of the gaps. The magnetic flux inside the gap can be added up in this way. The choke is thus suitable to filter the electromagnetic interferences in the differential mode.

Advantageously, the respective conductors of the at least one conductor pair can be arranged so as to revolve and so as to be distributed evenly around the longitudinal central axis of the choke. Advantageously, the respective conductor of the at least one conductor pair can pass through only once between the inner core and the outer core. In other words, the respective conductor of the at least one conductor pair can be wound neither around the inner core nor around the outer core. In other words, the number of windings of the conductors of the at least one conductor pair around the inner core and the outer core equals one. Advantageously, the respective conductor of the at least one conductor pair can be rigid or not very flexible, respectively. Advantageously, the respective conductor of the at least one conductor pair can be a plate-like or flat busbar. Advantageously, the respective conductor of the at least one conductor pair can have a substantially rectangular shaped cross-section. Advantageously, a cross section of the respective conductor of the at least one conductor pair can be adapted to the required intensity of current.

Advantageously, the gap is dielectric and/or diamagnetic. Advantageously, the gap can be an air gap. Advantageously, the width of the gap in the radial direction can be designed in such a way that the electromagnetic interferences in the differential mode are filtered at a maximum filter level. The electromagnetic interferences in the common mode are thereby filtered at a filter level, which is adapted to the maximum filter level of the differential mode. The width of the gap is a function of properties of the magnetic material of the outer core and of the inner core and the DC current level. In reality, the width of the gap is also influenced by production tolerances and positioning tolerances of the outer core and of the inner core.

In the EMI filter according to the invention, the choke can advantageously filter the electromagnetic interferences in the common mode and in the differential mode. The choke thereby does not have any windings, so that the choke and thus also the EMI filter are constructed in a simplified and compact manner. In addition, the cross section of the respective conductor of the at least one conductor pair can also be adapted freely, because the respective conductor of the at least one conductor pair does not have to be flexible. The choke can thus be adapted to the required intensity of current in a simplified manner.

In the case of an advantageous embodiment of the EMI filter, it can be provided that the inner core is a full or a hollow cylinder or a straight full or hollow prism comprising a regular polygonal base surface. The outer core is then a hollow cylinder or a straight hollow prism comprising a regular polygonal base surface. In addition, the inner core and the outer core are arranged coaxially inside one another, and the conductors of the at least one conductor pair are then arranged between the outer core and the inner core so as to be distributed evenly around the longitudinal central axis of the choke. In the case of this advantageous embodiment, the choke of the EMI filter is formed to be rotationally symmetrical around the longitudinal axis. The current can thus be distributed symmetrically in the choke, and the electromagnetic properties of the choke and of the EMI filter can be improved.

Advantageously, the gap can be an air gap. Advantageously, the conductors of the at least one conductor pair can be formed by means of plate-shaped busbars. Advantageously, it can be provided that the inner core and the outer core are formed of the same material or of different materials. Advantageously, the material or the materials can have a high magnetic permeability, in order to improve the filtering of the electromagnetic interferences in the common mode and in the differential mode. The properties of the material or of the materials influence the saturation of the inner core and of the outer core, and thus also the optimal width of the gap in the choke. As already described above, the width of the gap can be designed for the maximum filter level of the electromagnetic interferences in the common mode or in the differential mode.

Advantageously, it can be provided that the EMI filter has at least one X-capacitor and at least two Y-capacitors. The at least one X-capacitor is thereby interconnected with the conductors of the at least one conductor pair to form a differential mode electrical filter circuit. The at least two Y-capacitors are connected each between the respective conductor of the at least one conductor pair and a chassis of the inverter to form a common mode and differential mode electrical filter circuit. Advantageously, the chassis can be formed by metal casing. Advantageously, the Y-capacitors can be connected to the chassis via a ground plate. Advantageously, the at least two Y-capacitors and the at least one X-capacitor and the conductors can be material bonded to one another, preferably welded.

Advantageously, it can be provided that the choke of the EMI filter has at least two conductor pairs and thus at least two positive conductors and at least two negative conductors. The respective positive conductors and the respective negative conductors then alternate in the circumferential direction. Advantageously, the current can be distributed to the positive conductors and the negative conductors of the respective conductor pairs. High currents can thus flow through the choke. In addition, the currents can be distributed symmetrically in the choke, and the electromagnetic properties of the choke and of the EMI filter can be improved in the case of this advantageous embodiment. Advantageously, the choke can have exactly two conductor pairs or exactly three conductor pairs. It is also conceivable, however, that the choke has more than three conductor pairs. It goes without saying, however, that the number of the conductor pairs in the choke can be limited by the desired filter properties of the EMI filter, by the available space between the outer core and the inner core, and by the minimal required size of the gap in the circumferential direction. In addition, the number of the conductor pairs in the choke can be limited by the design of the inverter.

Advantageously, it can be provided that the conductors of the at least one conductor pair are received in the radial direction at least in some regions in an outer recess of the outer core and/or at least in some regions in an inner recess of the inner core. The width of the gap in the radial direction can thus be adapted independently of the width of the respective conductor by the adaptation of the depth of the outer recess in the radial direction.

Advantageously, it can be provided that the EMI filter has a dielectric housing, and the choke is received in the dielectric housing of the EMI filter in some regions. Advantageously, further components of the EMI filter can be received in the dielectric housing of the EMI filter in some regions. The housing can advantageously be formed of plastic. Advantageously, the housing can be formed in a casting process. Advantageously, the choke can be cast into the housing. Advantageously, the conductors of the at least one conductor pair of the choke can be cast into the housing. Advantageously, further components of the EMI filter can be cast into the housing.

The invention also relates to an inverter for an electric motor. The inverter thereby comprises a capacitor board comprising at least one capacitor. In the inverter, the at least one capacitor can be interconnected between the conductors of the at least one conductor pair. It goes without saying that the inverter can also comprise further components. In particular, the inverter can comprise at least one transistor board comprising at least two transistors. The capacitor board and the respective transistor board can then be electrically interconnected. According to the invention, the inverter has the above-described EMI filter. The EMI filter is thereby electrically switched with the capacitor board of the inverter. Advantageously, the EMI filter can have the direct current battery terminals of the inverter for interconnecting the inverter with a direct current source. The direct current battery terminals are then electrically interconnected with the capacitor board of the inverter.

With respect to its longitudinal central axis, the inverter can advantageously have an open longitudinal end facing the motor and a closed longitudinal end facing away from the motor. It goes without saying that this definition refers to an inverter, which is properly arranged on the electric motor. Advantageously, it can be provided that the EMI filter is fastened to a closed longitudinal end of the inverter, which faces away from the motor.

Advantageously, it can be provided that the conductors of the EMI filter are material bonded, preferably welded, to corresponding copper plates of the capacitor board of the inverter. Advantageously, the EMI filter can be material bonded, preferably welded, to the capacitor board from an open longitudinal end of the inverter, which faces the motor. The assembly of the EMI filter to the inverter can thus be simplified significantly.

Advantageously, the EMI filter can be firmly connected in a form-fitted and/or force-fitted manner. Advantageously, the EMI filter can be screwed to the inverter. Advantageously, the longitudinal central axis of the choke can be aligned parallel to the longitudinal central axis of the inverter or can coincide with the longitudinal central axis of the inverter.

Further important features and advantages of the invention follow from the subclaims, from the drawings, and from the corresponding figure description on the basis of the drawings.

It goes without saying that the above-mentioned features and the features, which will be described below, cannot only be used in the respective specified combination, but also in other combinations or alone, without leaving the scope of the present invention.

Preferred exemplary embodiments of the invention are illustrated in the drawings and will be described in more detail in the following description, whereby identical reference numerals refer to identical or similar or functionally identical components.

BRIEF DESCRIPTION OF THE DRAWINGS

In each case schematically.

DETAILED DESCRIPTION

Figure 1:
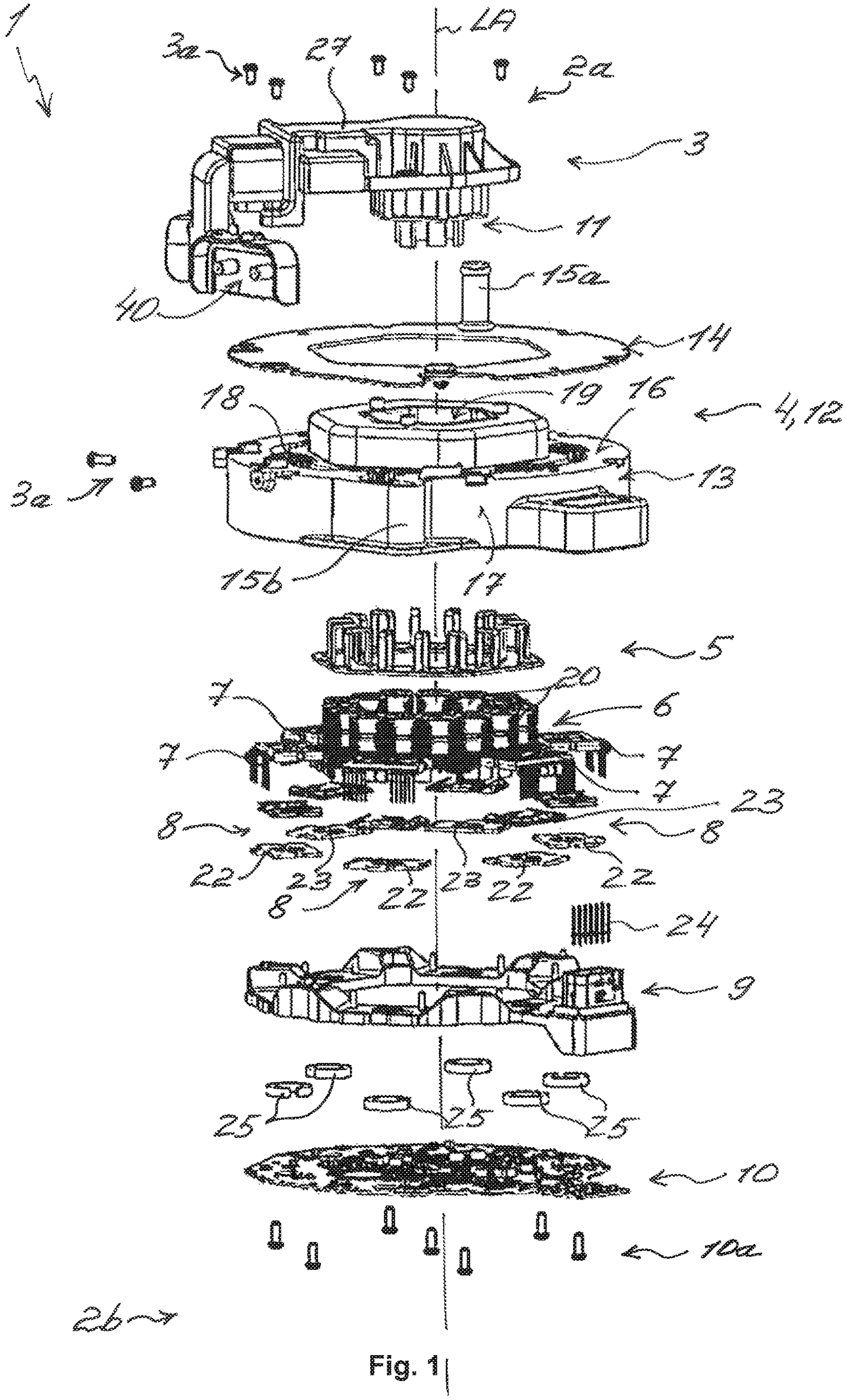
FIGS. 1 and 2 show views of an EMI filter according to the invention, which is illustrated without a housing.
Figure 2:
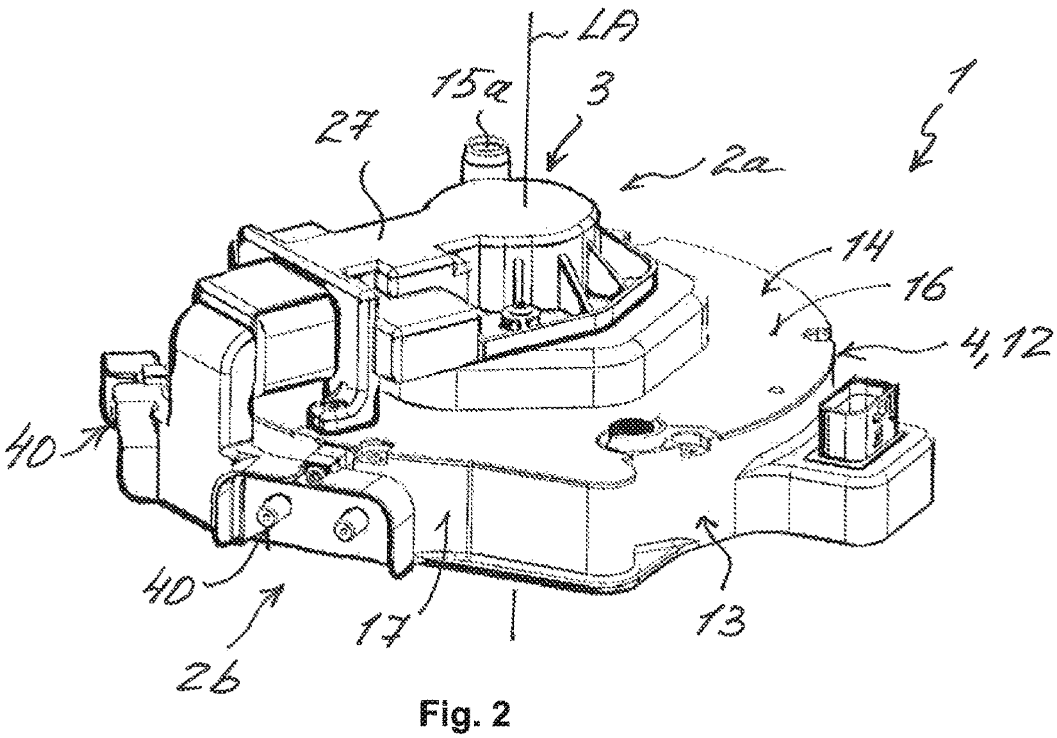
Figure 3:
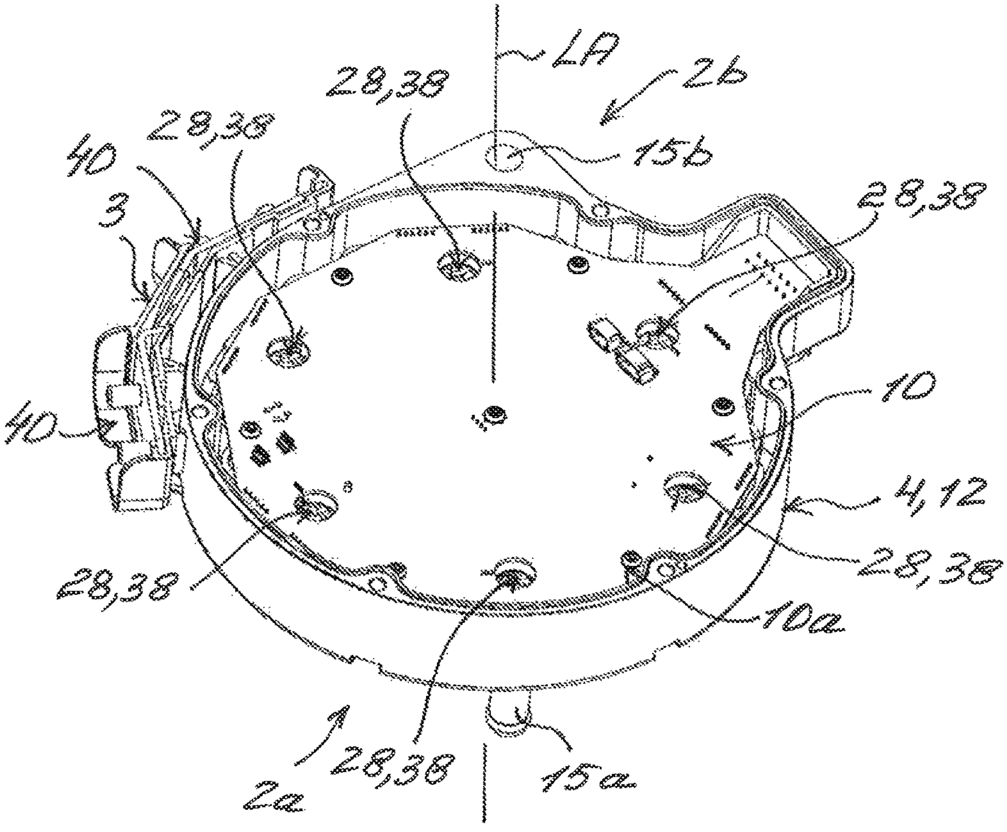
FIG. 3 shows an exploded view of the EMI filter according to the invention, which is illustrated without a housing.

FIG. 1 shows a lateral view of an EMI filter 1 according to the invention, which is illustrated without a housing here. FIG. 2 shows a view of the EMI filter 1 according to the invention, which is illustrated without a housing from the bottom here. FIG. 3 shows an exploded view of individual components of the EMI filter 1 according to the invention. The EMI filter thereby has a choke 2, several X-capacitors 3, several Y-capacitors 4, an E-choke 5, an electrically conductive ground plate 6, an electrically conductive positive pole battery terminal 7*a*, and an electrically conductive negative pole battery terminal 7*b*. The choke 2 thereby comprises a magnetic inner core 9, a magnetic outer core 10, and three conductor pairs 11, which each have an electrically conductive positive conductor 12*a* and an electrically conductive negative conductor 12*b*.

The respective positive conductors 12*a* and the respective positive pole battery terminal 7*a* are thereby realized by means of a positive pole element 13*a*, and the respective negative conductor 12*b* and the respective negative pole battery terminal 7*b* are thereby realized by means of a negative pole element 13*b*. The positive pole element 13*a* and the negative pole element 13*b* are thereby formed to be electrically conductive, and integrally, and plate-shaped, and folded. The respective positive conductors 12*a* and the positive pole battery terminal 7*a* are thus electrically conductive and are connected to one another in an electrically conductive manner. The respective negative conductors 12*b* and the negative pole battery terminal 7*b* are thus electrically conductive and are connected to one another in an electrically conductive manner. The positive conductors 12*a* and the negative conductors 12*b* are thereby formed to be flat or plate-like, respectively, or as plate-like busbars, respectively.

In the choke 2, the inner core 9, the outer core 10, the respective positive conductors 12*a*, and the respective negative conductors 12*b* extend along a longitudinal central axis LA of the choke 2. The conductors 12*a* and 12*b*, the inner core 9 and the outer core 10 are electrically insulated from each other. The electrical insulation can be realized by the air. Alternatively, the conductors 12*a*,12*b*, the inner core 9 and the outer core 10*a* can be molded in a plastic housing to provide electrical insulation. The respective positive conductors 12*a* and the respective negative conductors 12*b* are thereby arranged between the inner core 9 and the outer core 10 in a radial direction, which is aligned radially to the longitudinal central axis LA. In addition, the respective positive conductors 12*a* and the respective negative conductors 12*b* are arranged so as to alternate and so as to be distributed evenly in a circumferential direction, which revolves around the longitudinal central axis LA. In addition, the respective adjacent conductors 12*a* and 12*b* are arranged spaced apart from one another in the circumferential direction, so that a gap 14 is in each case formed between the inner core 9, the outer core 10, and the respective conductors 12*a* and 12*b*, which are adjacent in the circumferential direction. The advantageous properties of the choke 2 will be described in more detail below on the basis of FIG. 7-11.

The choke 2, the X-capacitors 3, and the Y-capacitors 4 are electrically interconnected to form a filter circuit 8. In addition, the ground plate 6, the positive pole battery terminal 7*a*, and the negative pole battery terminal 7*b* are electrically interconnected with the filter circuit 8. The X-capacitors 3 are each interconnected with the respective conductors 12*a*, 12*b* of the respective conductor pair 11 of the choke 2 and the Y-capacitors 4 are connected each between the respective conductor 12*a*, 12*b* of the at respective conductor pair 11 and the chassis—here a metal casing—of the inverter 1 through the ground plate 6. As can be seen particularly well in FIG. 3, the E-choke 5 has two E-shaped magnetic cores 15, which are arranged around the positive pole element 13*a* and the negative pole element 13*b*. The E-choke 5 or the cores 15, respectively, are thereby arranged between the choke 2 or the positive conductors 12*a*, respectively, as well as negative conductors 12*b* and the positive pole battery terminal 7*a* as well as the negative pole battery terminal 7*b*.

Figure 4:
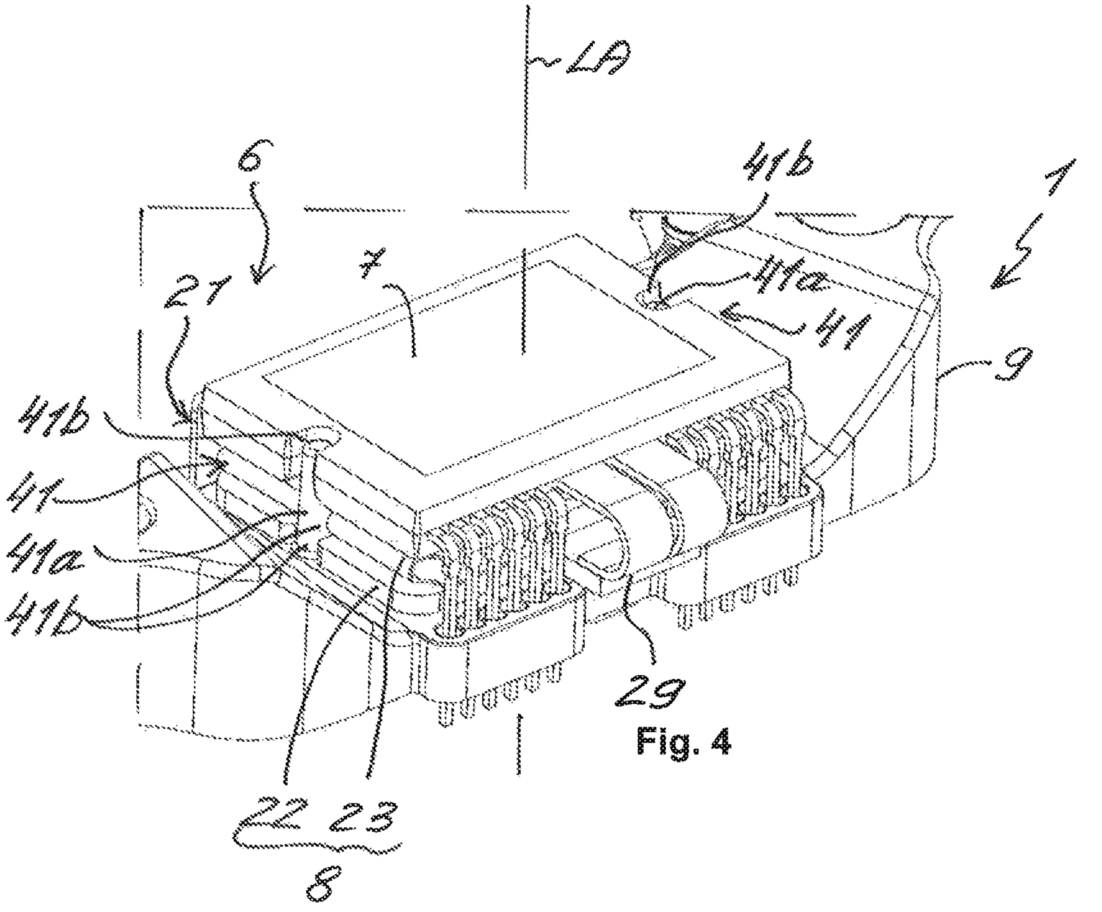
FIG. 4 shows a view of the EMI filter according to the invention, which is illustrated with a housing.

FIG. 4 shows a view of the EMI filter 1 according to the invention. FIG. 4 shows the EMI filter 1 with a housing 16, which encloses or surrounds, respectively, the components of the EMI filter 1 at least in some regions. The housing 16 is dielectric and can be formed of a plastic. The housing 16 can in particular be formed in a casting process, wherein the components of the EMI filter 1 can then be cast in.

With reference to FIG. 1-4, the EMI filter 1 is provided for an inverter for an electric motor. If the EMI filter is interconnected with the inverter, the respective conductors 12*a* and 12*b* are connected in an electrically conductive manner to a capacitor board of the inverter. The positive pole battery terminal 7*a* and the negative pole battery terminal 7*b* then form direct current battery terminals of the inverter.

Figure 5:
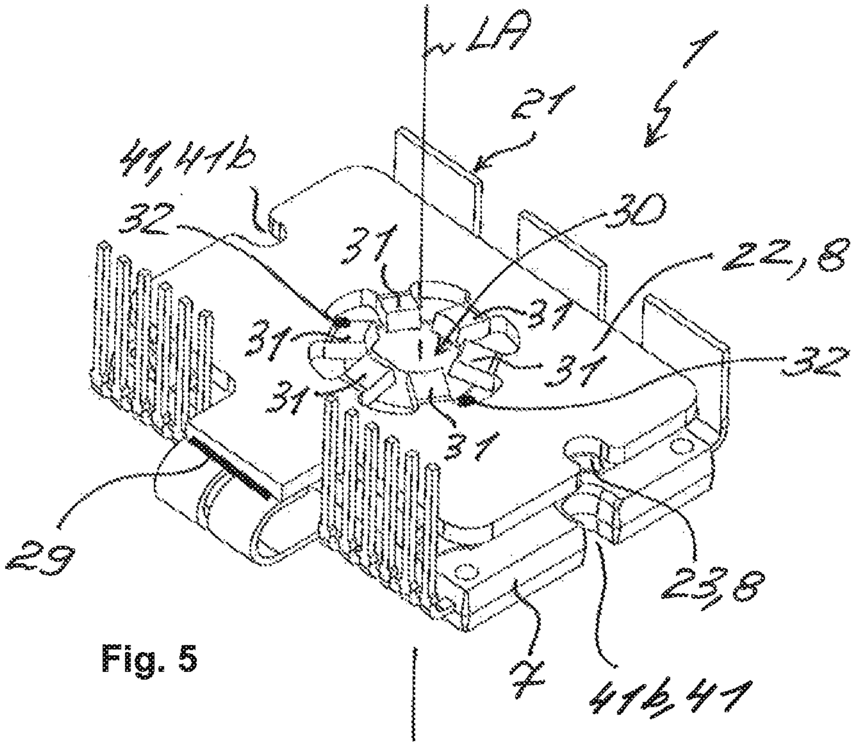
FIG. 5 shows a view of a choke in the EMI filter according to the invention.

FIG. 5 shows a view of the choke 2 in the EMI filter 1 according to the invention. As can be seen particularly well here, the positive conductors 12*a* and the negative conductors 12*b* are arranged so as to alternate and so as to be distributed evenly in the circumferential direction. The inner core 9 and the outer core 10 are in each case shown by a hollow straight prism with a regular hexagonal base surface. The respective one of the six conductors 12*a* or 12*b*, respectively, is in each case assigned to one of the six edges/sides of the respective prism. The respective conductor 12*a* or 12*b*, respectively, is thereby in each case arranged in an outer recess 17 of the outer core 10.

In the choke 2, the respective conductors 12*a* and 12*b* are encased or are surrounded on the outside, respectively, by the outer core 10 in the circumferential direction, whereby the choke 2 is suitable to filter the electromagnetic interferences in the common mode. In addition, the inner core 9 is encased or surrounded on the outside, respectively, by the respective conductors 12*a* and 12*b* in the circumferential direction, so that the choke 2 is suitable to filter the electromagnetic interference in the differential mode. In addition, the choke 2 has a high symmetry, and the current can be distributed symmetrically in the choke 2. The electromagnetic interferences can thus be filtered out particularly efficiently.

The properties of the choke 2 will be described in more detail below on the basis of FIG. 6-11. For this purpose, the choke 2 is shown in a model. In the model, the positive conductors 12*a* and the negative conductors 12*b* are numbered consecutively one after the other with numbers 1 to 6 in the circumferential direction. The respective three positive conductors 12*a* of the choke 2 are thereby identified with numbers 1, 3, and 5. The respective three negative conductors 12*b* of the choke 2 are thereby identified with numbers 2, 4, and 6.

A magnetic coupling between the individual conductors 12*a* and 12*b* is created in the choke 2 by means of the outer core 10, which encases or surrounds the conductors 12*a* and 12*b* on the outer side, respectively. Inductances are thus created between the individual conductors 12*a* and 12*b*.

The created common mode inductances can be combined as follows in a matrix:

$$[L_{CM}] = \begin{bmatrix} L_{CM11} & L_{CM12} & L_{CM13} & L_{CM14} & L_{CM15} & L_{CM16} \\ L_{CM21} & L_{CM22} & L_{CM23} & L_{CM24} & L_{CM25} & L_{CM26} \\ L_{CM31} & L_{CM32} & L_{CM33} & L_{CM34} & L_{CM35} & L_{CM36} \\ L_{CM41} & L_{CM42} & L_{CM43} & L_{CM44} & L_{CM45} & L_{CM46} \\ L_{CM51} & L_{CM52} & L_{CM53} & L_{CM54} & L_{CM55} & L_{CM56} \\ L_{CM61} & L_{CM62} & L_{CM63} & L_{CM64} & L_{CM65} & L_{CM66} \end{bmatrix}$$

The created differential mode inductances can be combined as follows in a matrix:

$$[L_{DM}] = \begin{bmatrix} L_{DM11} & L_{DM12} & L_{DM13} & L_{DM14} & L_{DM15} & L_{DM16} \\ L_{DM21} & L_{DM22} & L_{DM23} & L_{DM24} & L_{DM25} & L_{DM26} \\ L_{DM31} & L_{DM32} & L_{DM33} & L_{DM34} & L_{DM35} & L_{DM36} \\ L_{DM41} & L_{DM42} & L_{DM43} & L_{DM44} & L_{DM45} & L_{DM46} \\ L_{DM51} & L_{DM52} & L_{DM53} & L_{DM54} & L_{DM55} & L_{DM56} \\ L_{DM61} & L_{DM62} & L_{DM63} & L_{DM64} & L_{DM65} & L_{DM66} \end{bmatrix}$$

In both cases, L_CM/DM_xx thereby represents a self-inductance of the respective conductor 12*a* or 12*b*, respectively, and L_CM/DM_yx represents a mutually generated inductance between the respective conductors 12*a* or 12*b*, respectively. If x does not equal y, then L_CM/DM_xy=L_CM/DM_yx. If the electrical resistances R_xx of the respective conductors 12*a* and 12*b* are considered as well, the equivalent circuit diagram shown in FIG. 6 results.

Figure 6:
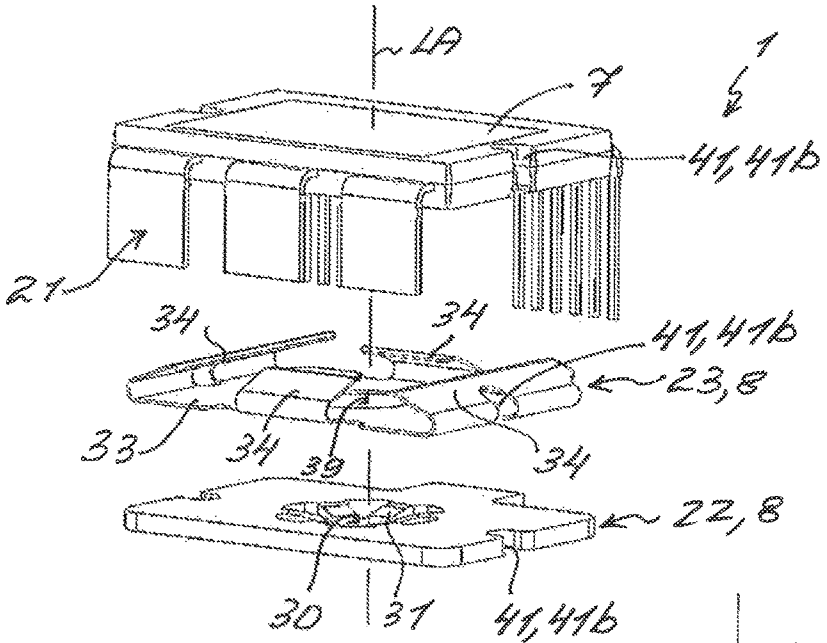
FIG. 6 shows an equivalent circuit diagram of the choke illustrated in FIG. 5 of the EMI filter according to the invention.

FIG. 6 thus shows the equivalent circuit diagram of the choke 2 according to the above-described model. Three upper branches thereby represent the respective positive conductors 12*a* of the choke 2. Three lower branches thereby represent the respective negative conductors 12*b* of the choke 2.

In the case of the respective positive conductors 12*a* of the choke 2, which are numbered with 1, 3, and 5:

- I_DC—identifies the direct current in the choke 2;
- I_DC/3—identifies the partial direct current in the respective positive conductor 12*a;*
- i_DM11, i_DM33, i_DM55—identifies the differential mode partial direct current in the respective positive conductor 12*a;*
- i_CM11, i_CM33, i_CM55—identifies the common mode partial direct current in the respective positive conductor 12*a;*
- R_11, R_33, R_55—identifies the electrical resistance of the respective positive conductor 12*a;*
- L_DM11, L_DM33, L_DM55—identifies the differential mode self-inductance of the respective positive conductor 12*a;*
- L_CM11, L_CM33, L_CM55—identifies the common mode self-inductance of the respective positive conductor 12*a* in equivalent circuit diagram.

In the case of the respective negative conductors 12*b* of the choke 2, which are numbered with 2, 4, and 6:

- I_DC—identifies the direct current in the choke 2;
- I_DC/3—identifies the partial direct current in the respective negative conductor 12*b;*
- i_DM22, i_DM44, i_DM66—identifies the differential mode partial direct current in the respective negative conductor 12*b;*
- i_CM22, i_CM44, i_CM66—identifies the differential mode partial direct current in the respective negative conductor 12*b;*
- R_22, R_44, R_66—identifies the electrical resistance of the respective negative conductor 12*b;*
- L_DM22, L_DM44, L_DM66—identifies the differential mode self-inductance of the respective negative conductor 12*b;*
- L_CM22, L_CM44, L_CM66—identifies the common mode self-inductance of the respective negative conductor 12*b* in the equivalent circuit diagram.

The electrical resistances R11, R33, R55, R22, R44, R66 are combined to form a block RES block. The differential mode self-inductances L_DM11, L_DM33, L_DM55, L_DM22, L_DM44, L_DM66 are combined to form a block LDM_block. What applies for this block LDM_block is: (L M)/2. Here, the L refers to self-inductance of each conductor 12*a*, 12*b* or diagonal elements in the matrix [L_DM]—elements L_DM11, L_DM33, L_DM55, L_DM22, L_DM44, L_DM66—and the M refers to the mutual inductance between two conductors 12*a*, 12*b* or out-diagonal elements in the matrix [L_DM] L_xy, where x does not equal y. The common mode self-inductances L_CM11, L_CM33, L_CM55, L_CM22, L_CM44, L_CM66 are combined to form a block LCM_block. What applies for this block LCM_block is: (L+M)/2. Here, the L refers to self-inductance of each conductor 12*a*, 12*b* or diagonal elements in matrix [L_CM]—elements L_CM11, L_CM33, L_CM55, L_CM22, L_CM44, L_CM66—and the M refers to the mutual inductance between two conductors 12*a*, 12*b* or out-diagonal elements in matrix [L_CM]—elements Lxy, where x does not equal y.

Figure 7:
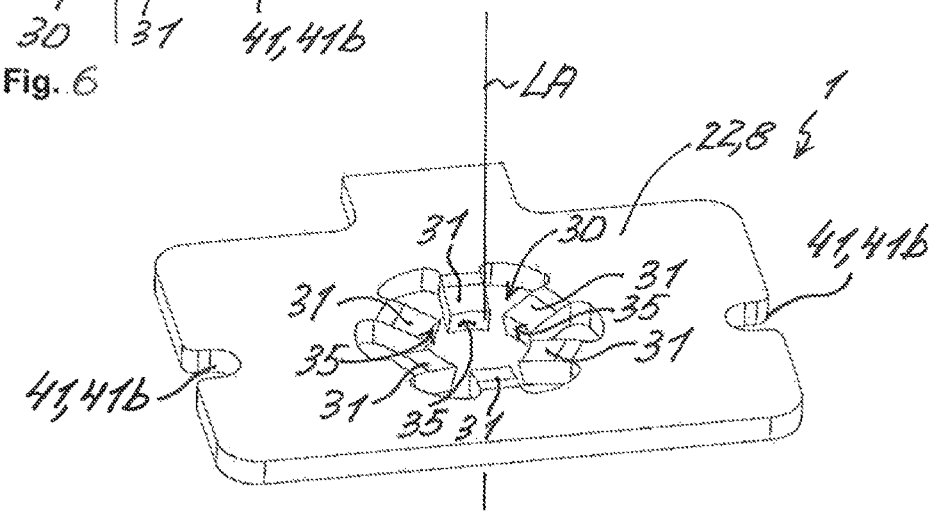
FIG. 7 shows a view of the choke illustrated in FIG. 5 with the modeled course of the magnetic flux.

FIG. 7 shows a view of the choke 2 with the modelled course of magnetic flux within the choke 2. It can be seen in FIG. 7 that the magnetic flux of the common mode in the inner core 9 and in the outer core 10 in each case tends to flow in the same direction. The magnetic flux of the differential mode tends to bridge the gap 14.

Figure 8:
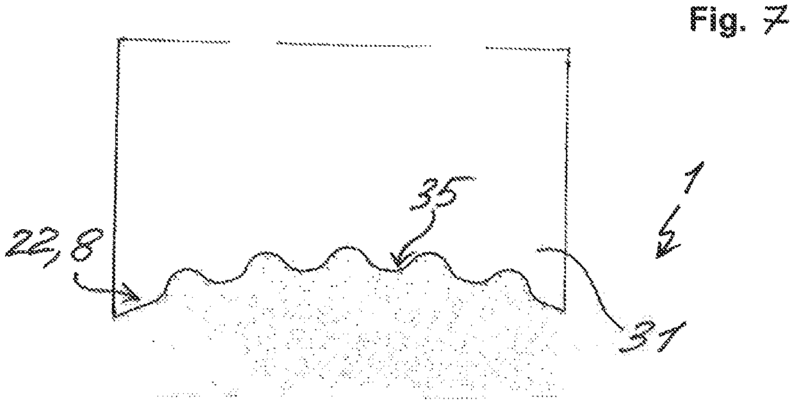
FIGS. 8 to 11 show diagrams for characterizing the choke illustrated in FIG. 5 and FIG. 7.

FIG. 8 shows a diagram for characterizing the choke 2. The diagram shows the differential mode inductance L_DM14, L_DM12, LDM_16 between one of the positive conductors 12*a* and each of the three negative conductors 12*b*. The differential mode inductance is defined as the inductance between two conductors 12*a*, 12*b* carrying the opposite way current. Thus only the inductances L_DM14, L_DM12, LDM_16 are relevant for differential mode filtering. The differential mode inductance is thereby plotted in nH against the width of the gap in mm at a direct current I_DC equal to 1100 A. The maximum differential mode inductance L_DM14 is thereby generated between the conductors 12*a* and 12*b*, which are located opposite one another and at a maximum distance.

Figure 9:
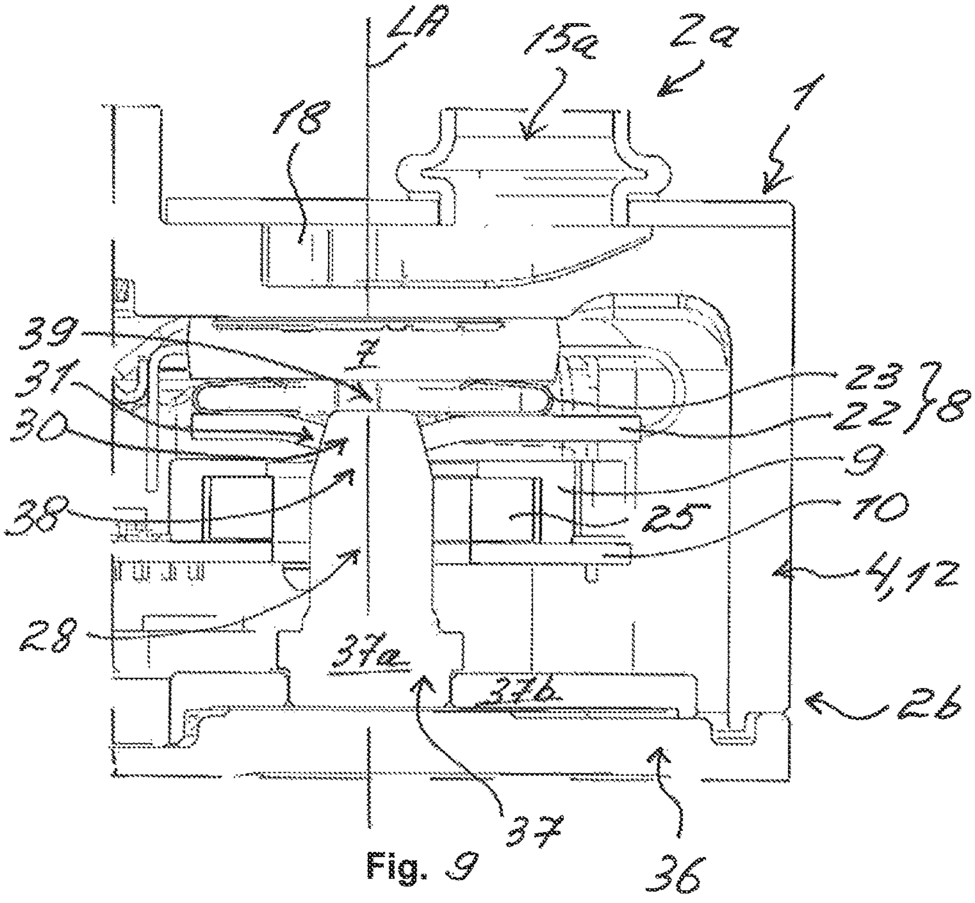

FIG. 9 shows a further diagram for characterizing the choke 2. The diagram shows the common mode inductance L_CM12, L_CM16 between one of the positive conductors 12*a* and the adjacent negative conductors 12*b*. Because of the choke symmetry, the follow equalities apply:

L_DM14=L_DM25=L_DM36

L_DM41=L_DM14

L_DM52=L_DM25

L_DM63=L_DM36.

The common mode inductance is thereby plotted in pH against the width of the gap 14 in mm at a direct current I_DC equal to 1100 A. The common mode inductance L_CM12, L_CM16 is thereby identical in the case of both pairs of the conductors 12*a* and 12*b*.

Figure 10:
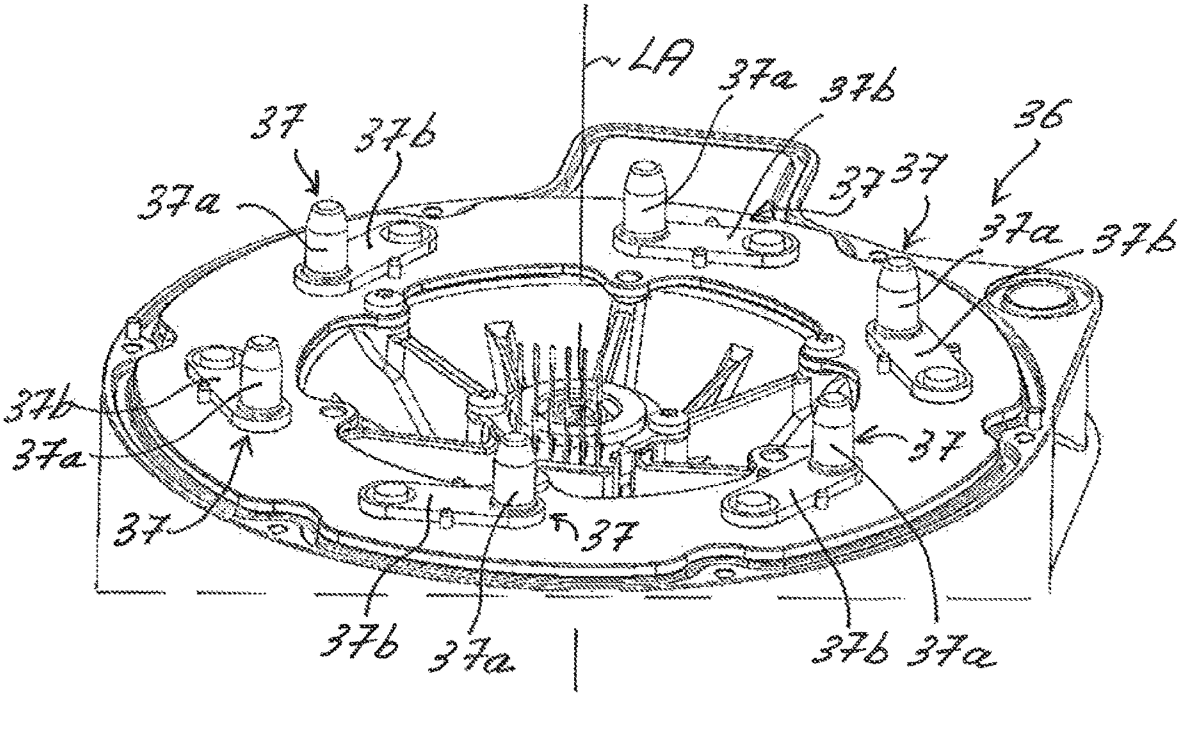

FIG. 10 shows a further diagram for characterizing the choke 2. The diagram shows the differential mode inductance L_DM12, L_DM14, L_DM16 between one of the positive conductors 12*a* and each of the three negative conductors 12*b*. The common mode inductance is thereby plotted in nH against the direct current I_DC in A with the width of the gap 14 equal to 1050 μm. The differential mode inductance L_DM12, L_DM14, L_DM16 thereby shows a constant connection with the direct current I_DC until the saturation of the inner core 9 and of the outer core 10.

Figure 11:
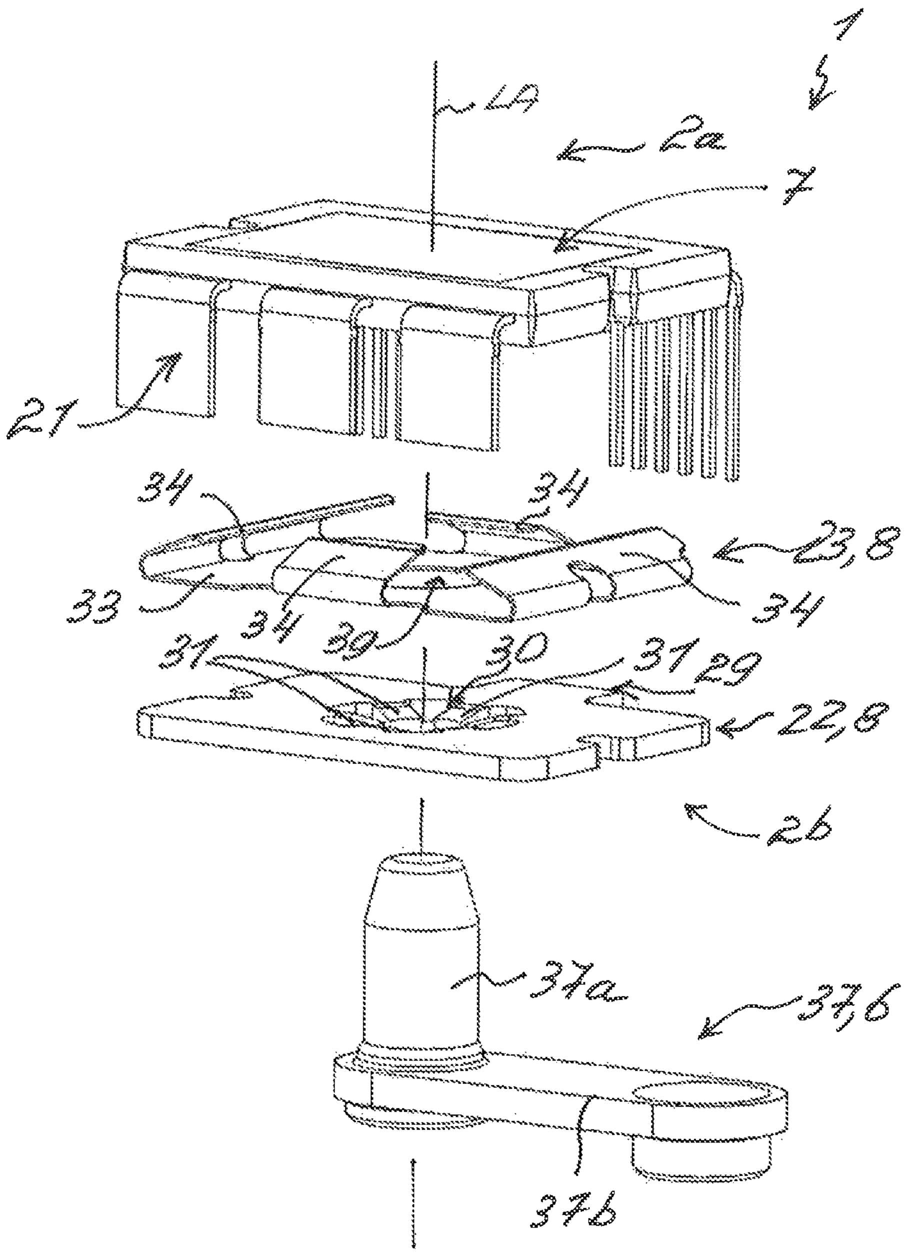

FIG. 11 shows a further diagram for characterizing the choke 2. The diagram shows the common mode inductance L_CM14 between one of the positive conductors 12*a* and the negative conductor 12*b*, which is located opposite at a maximum distance. The common mode inductance is thereby plotted in pH against the direct current I_DC in A with the width of the gap 14 equal to 1050 μm. The common mode inductance L_CM14 decreases with the increasing direct current I_DC. This is due to the fact that the magnetic material of the inner core 9 and of the outer core 10 approach the magnetic saturation, and the permeability of the material decreases.

The invention claimed is:

1. An inverter for an electric motor, comprising:

a capacitor board including at least one capacitor and at least one transistor board;

the capacitor board and the at least one transistor board each oriented transversely to a longitudinal direction;

the capacitor board and the at least one transistor board electrically interconnected;

at least one electrically conductive contacting unit for contacting at least one electrically conductive phase terminal of the motor;

the at least contacting unit connected to the at least one transistor board in an electrically conductive manner;

wherein the at least one contacting unit is resilient in the longitudinal direction;

wherein the at least one contacting unit includes a plate-like electrically conductive contact plate and a spring element;

wherein the contact plate is oriented transversely to the longitudinal direction; and wherein the spring element is arranged axially between the contact plate and the at least one transistor board, and resiliently connects the at least one transistor board and the contact plate to one another.

2. The inverter according to claim 1, further comprising a cooling element, wherein:

the cooling element is oriented transversely to the longitudinal direction at least in some regions; and in response to an axial pressing force, the at least one contacting unit presses the at least one transistor board against the cooling element axially to facilitate a transfer of heat.

3. The inverter according to claim 1, wherein:

the spring element is material bonded to the contact plate;

the contact plate is connected in an electrically conductive and material bonded manner to the at least one transistor board; and/or the at least one transistor board and the capacitor board are material bonded to one another at a contact point.

4. The inverter according to claim 1, wherein:

the spring element includes (i) a plate-like plate element oriented transversely to the longitudinal direction and (ii) at least two feet integrally connected to the plate element; and the spring element rests with the plate element against the contact plate and resiliently with the at least two feet against the at least one transistor board.

5. The inverter according to claim 1, wherein the contact plate includes:

a central contact opening configured to receive and engage the at least one phase terminal in an electrically conductive manner; and at least two contact pins disposed at the contact opening, the at least two contact pins projecting towards a center of the contact opening and axially away from the spring element.

6. The inverter according to claim 5, wherein:

the at least two contact pins each have a contact surface facing towards the center of the contact opening; and the contact surface of each of the at least two contact pins includes a groove structure.

7. An electric motor, comprising:

an inverter;

a motor body; and at least one electrically conductive phase terminal extending axially towards the inverter at least in some regions;

the inverter including:

a capacitor board including at least one capacitor and at least one transistor board, the capacitor board and the at least one transistor board electrically interconnected and each oriented transversely to a longitudinal direction; and at least one electrically conductive contacting unit connected to the at least one transistor board in an electrically conductive manner, the at least one contacting unit resilient in the longitudinal direction;

wherein a longitudinal end of the inverter, which faces the motor body, is axially attached to the motor body; and wherein the at least one contacting unit is contacted in an electrically conductive manner with the at least one phase terminal.

8. The motor according to claim 7, wherein:

the inverter further includes a cooling element;

the at least one phase terminal provides an axial pressing force on the at least one contacting unit; and via the axial pressing force, the at least one contacting unit presses the at least one transistor board against the cooling element axially to facilitate a transfer of heat.

9. The motor according to claim 7, further comprising an axis of rotation, wherein:

the at least one phase terminal includes six phase terminals arranged around the axis of rotation; and the at least one transistor board includes six transistor boards for the six phase terminals, the six transistor boards arranged around the at least one capacitor.

10. The motor according to claim 7, wherein the at least one contacting unit includes:

a plate-like electrically conductive contact plate extending transversely to the longitudinal direction; and a spring element arranged axially between the contact plate and the at least one transistor board, the spring element resiliently connecting the at least one transistor board and the contact plate to one another.

11. The motor according to claim 10, wherein:

the contact plate includes a central contact opening and a plurality of contact pins projecting radially into the contact opening, the plurality of contact pins angled axially away from the spring element; and the at least one phase terminal is arranged in the contact opening and contacts the plurality of contact pins in an electrically conductive manner.

12. The motor according to claim 11, wherein:

the plurality of contact pins each have a radially inward facing contact surface; and the contact surface of each of the plurality of contact pins includes a groove structure contacting the at least one phase terminal.

13. The inverter according to claim 1, wherein the contact plate includes:

a central contact opening configured to receive and engage the at least one phase terminal in an electrically conductive manner; and a plurality of contact pins projecting radially into the contact opening, the plurality of contact pins angled axially away from the spring element.

14. The inverter according to claim 13, wherein:

the plurality of contact pins each have a radially inward facing contact surface; and the contact surface of each of the plurality of contact pins defines a conical surface segment.

15. The inverter according to claim 13, wherein:

the plurality of contact pins each have a radially inward facing contact surface; and the contact surface of each of the plurality of contact pins includes a plurality of grooves.

16. The inverter according to claim 15, wherein at least a portion of the contact surface of each of the plurality of contact pins has a wave-shaped profile that defines the plurality of grooves.

17. The inverter according to claim 1, wherein:

the spring element is welded to the contact plate;

the contact plate is welded to the at least one transistor board in an electrically conductive manner; and the at least one transistor board and the capacitor board are welded to one another at a contact point.

18. The inverter according to claim 1, wherein:

the spring element includes (i) a plate-like plate element oriented transversely to the longitudinal direction and (ii) at least two resilient feet extending transversely to the plate element;

the at least two feet each include a curved portion and are each integrally connected to the plate element by the curved portion;

the plate element directly contacts and rests against the contact plate; and the at least two feet directly contact and resiliently rest against the at least one transistor board.

19. An inverter for an electric motor, comprising:

a capacitor board;

a plurality of capacitors arranged symmetrically in a circle on the capacitor board; and a plurality of transistor boards electrically connected to the capacitor board, the plurality of transistor boards arranged radially outside the plurality of capacitors and distributed evenly around the plurality of capacitors in a circumferential direction;

a plurality of electrically conductive contacting units each configured to contact an associated electrically conductive phase terminal of the motor, the plurality of contacting units each connected to an associated transistor board of the plurality of transistor boards in an electrically conductive manner; and wherein the plurality of contacting units are resilient in an axial direction and are configured to press against the associated transistor board when subjected to an axial pressing force.

* * * * *